United States Patent
Meserole

[11] 3,758,139
[45] Sept. 11, 1973

[54] CONNECTION ENDS ON DUCT OR CONDUIT SECTION

[75] Inventor: Robert H. Meserole, Somerville, N.J.

[73] Assignee: Johns-Manville Corporation, New York, N.Y.

[22] Filed: Sept. 8, 1972

[21] Appl. No.: 287,372

Related U.S. Application Data

[62] Division of Ser. No. 88,816, Nov. 12, 1970, Pat. No. 3,708,867.

[52] U.S. Cl............. 285/332, 285/DIG. 4, 285/424
[51] Int. Cl. ......................... F16i 25/00, F16i 35/00
[58] Field of Search............................ 138/155, 173; 113/116 UT, 116 EE; 285/390, 424, 183, 332, 55, DIG. 4

[56] References Cited
UNITED STATES PATENTS

| | | | |
|---|---|---|---|
| 525,061 | 8/1894 | Schmidt et al.................. | 285/424 X |
| 1,011,363 | 12/1911 | Parry..................... | 113/116 UT UX |
| 1,049,542 | 1/1913 | Smith...................... | 285/DIG. 4 UX |
| 1,798,121 | 3/1931 | Jackes et al. ......................... | 285/55 |
| 2,818,281 | 12/1957 | Kurti.............................. | 285/424 X |
| 3,207,538 | 9/1965 | Pattillo............................ | 285/424 X |
| 3,501,179 | 3/1970 | Boynton et al. ................ | 285/424 X |

FOREIGN PATENTS OR APPLICATIONS

| | | | |
|---|---|---|---|
| 529,949 | 9/1921 | France................................ | 285/424 |

Primary Examiner—Charlie T. Moon
Attorney—John A. McKinney et al.

[57] ABSTRACT

A method of reforming ends of tubular sheet metal duct or conduit sections having helically grooved walls so as to enable such sections to be connected in end-to-end relationship.

2 Claims, 6 Drawing Figures

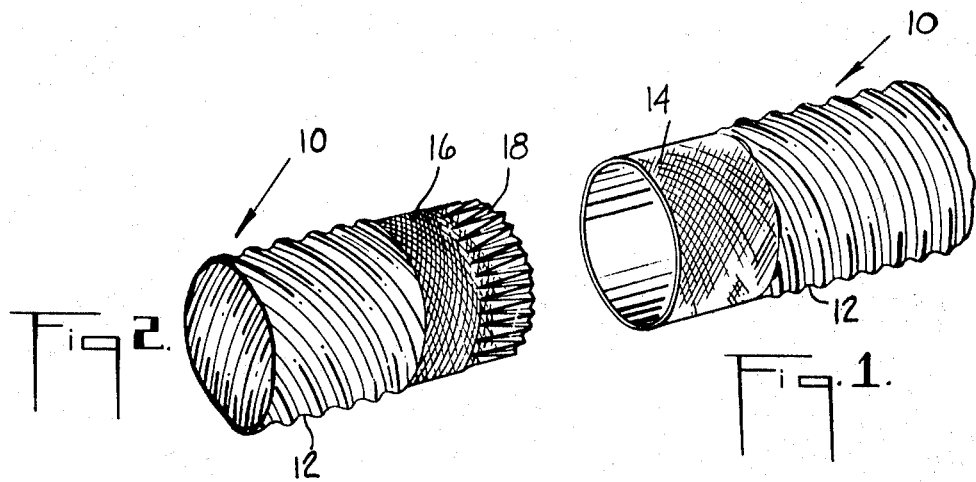
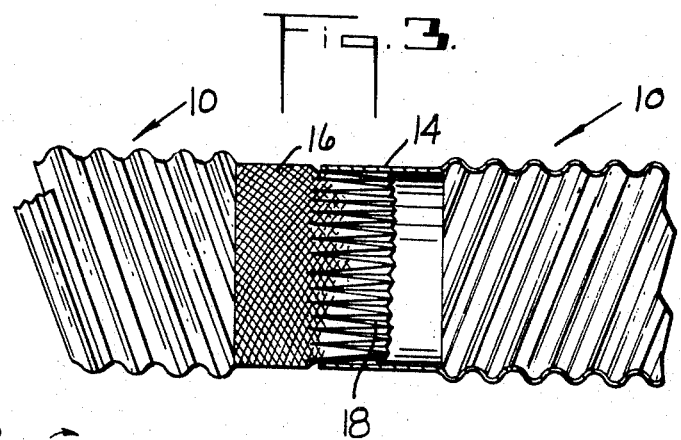
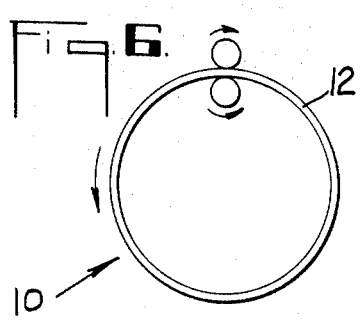
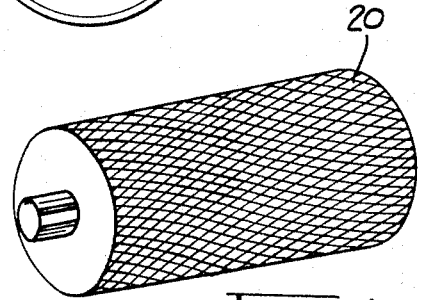
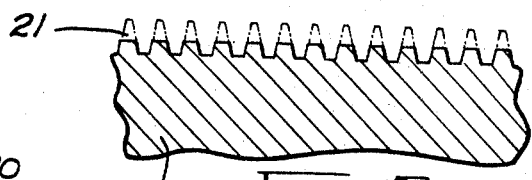

CONNECTION ENDS ON DUCT OR CONDUIT SECTION

This is a Division of application Ser. No. 88,816, filed Nov. 12, 1970, now U.S. Pat. No. 3,708,867.

BACKGROUND OF THE INVENTION

This invention relates to a method of reforming ends of round sheet metal duct or conduit sections having helically corrugated walls so as to enable like sections to be connected end-to-end for transmission of air or other fluids or liquids therethrough.

It is common in the prior art to provide mechanical connection means between tubular sections of sheet metal duct. This is accomplished in numerous ways. One method of connecting plain tubular sections is to merely taper crimp an end of one section and to insert it into a plain or outwardly flared end of another section. Another method is by inserting a metal liner internally between two sections so that it extends on either side of the joint to lend stability to the joint. The joint may they be covered on the outside. Other methods include placing a reinforcing member around the outside of joining sections and clamping or otherwise securing it thereto. An adhesive or sealant may be used to establish a tight joint.

It has been found difficult, however, to effectively and economically provide a connection between duct sections having helically corrugated walls. While there is substantial art on mechanical means for establishing connections, they are inapplicable for establishing a connection involving a corrugated surface.

Generally, the joining of sections of helically grooved duct is impractical without the use of an additional sleeve to hold concentricity. Additionally, it is difficult to provide a joint for helical wall ducting with standard fittings such as trunk duct takeoffs, wall stack fittings or mixing box connections. The helical grooves do not extend in a smooth manner longitudinally transversely of the section, and, therefore, tend to buckle and flare when worked with standard smooth surface rolls. The helical seam in helically grooved conduit comprises multi-layers of wall thicknesses and are also difficult to cut or work.

BRIEF SUMMARY OF THE INVENTION

It is an object of this invention to provide a method for reforming the ends of helically grooved or corrugated duct walls so as to enable one section to be connected to another in end-to-end relationship.

It is a further object of this invention to provide a method of reworking the ends of helically corrugated duct walls by first patterning as by knurling or otherwise deforming the walls having the formations to define a generally more smooth cylindrically shaped collar or sleeve of a diameter ranging generally between the major and minor diameters of the hills and valleys of the helical corrugations or formations, and thereafter providing the collar with a tapering crimp in one extremity to reduce its size for entry into an uncrimped collar or sleeve of another duct section.

BRIEF DESCRIPTION OF THE DRAWINGS

The invention will be more fully understood and further objects and advantages thereof will become apparent when reference is made to the following detailed description of the preferred embodiment of the invention and the accompanying drawings in which:

FIG. 1 represents a portion of one section of duct or conduit having an end reformed according to the present invention;

FIG. 2 represents a portion of another section of duct or conduit having one end reformed according to the present invention;

FIG. 3 illustrates a connection established between the two duct sections with one section being shown in cross-section;

FIG. 4 is a perspective view of a knurling roller;

FIG. 5 is a cross-sectional view of a knurling roller showing a profile adapted for use with this method;

FIG. 6 represents a duct end being rolled to at least partially remove the original helical corrugations.

PREFERRED EMBODIMENT OF THE INVENTION

Referring to the drawings there is illustrated portions of sheet metal ducts or conduits having walls formed with helical corrugations. It is known in the art to form tubular pipe from strip material to have helical seams and corrugated walls. In FIGS. 1 and 2, there are illustrated portions of two sections of sheet metal ducts 10 adapted to be connected in end-to-end relationship. The walls of duct sections 10 are provided with helical corrugations or grooves 12 for strengthening and providing longitudinally rigidity to a section of duct. Ducting of the type referred to herein in normally formed continuously from strip material into sizes ranging from diameters of just a few inches to well over a foot. They are cut into desired lengths as a step in the continuous process.

In order to establish the desired connection, each end of the duct sections is first provided with reformed collar or sleeve portions as indicated by numerals 14,16. This step involves patterning over helical corrugations as for example by a knurling roller to provide a generally more smooth surface. However, there will be folds, undulations or hills and valleys in the newly formed surface to accommodate flow of metal. Generally, however, the surface will be more smooth than the original corrugations. The collars or sleeves are normally formed by inserting the duct section ends between a pair of mating knurling rollers as shown in FIG. 6 which rotate the duct around to pattern the periphery.

A knurling roller 20 is shown in perspective view of FIG. 4 and the cross-sectional view of FIG. 5. As indicated in FIG. 5, it has been found desirable to use a modified face on the knurler. This has been accomplished by removing a portion of the projections as indicated by numeral 21. The user should experiment with knurler facings for the desired result depending upon size of the duct, wall thickness and material.

It has been found that sleeve portions 14, 16 best form a diameter generally between the major and minor diameters of the corrugated ducts. This permits their formation with a minimum of metal flow or reworking between the hills and valleys of the walls. It has been found in the rolling step that excess metal is caused to flow into new knurled surface and that folds may develop in the corrugated wall so that the collars do not grow in diameter or length.

A second step is performed on one collar of each length or section to provide a taper. As shown in FIGS. 2 and 3, the extremity or free end of collar 16 is crimped to provide a taper 18 of reduced diameter which is adapted to be received into collar or portion 14. The established connection is shown in FIG. 3 where the ends are forced together to a tight or interference fit. This establishes a simple connection which is sufficient for many types of service. It a more durable connection is desired to meet specific service conditions, tapes or bands may be applied around the joint. Adhesives and sealants may be used to seal the joint from leaks.

Certain steps and operations have been disclosed for establishing an improved connection between lengths of corrugated duct or conduit. The invention is limited only by the scope of the claims herein.

What I claim is:

1. A tubular sheet metal duct section comprising:
   a. first and second end portions, said first and second end portions having generally cylindrical walls with knurled surfaces, said first end portion being of a first diameter, said second end portion having a tapered extremity of a diameter less than said first diameter to enable said tapered extremity to be received in a first end portion of another duct section and a section adjacent said tapered extremity of a diameter substantially equal to the first diameter, and
   b. an intermediate portion extending between said end portions, said intermediate portion having a helically corrugated wall.

2. The tubular sheet metal duct section as defined in claim 1 wherein said tapered extremity has crimps therein to reduce the diameter.

* * * * *